United States Patent [19]

Waddell

[11] Patent Number: 5,109,300
[45] Date of Patent: Apr. 28, 1992

[54] VARIABLE FOCAL LENGTH MIRROR ASSEMBLY INCLUDING A FLEXIBLE MEMBRANE

[75] Inventor: Peter Waddell, St. Leonards, Scotland

[73] Assignee: University of Strathclyde, Glasgow, Scotland

[21] Appl. No.: 634,929

[22] Filed: Dec. 27, 1990

Related U.S. Application Data

[63] Continuation of Ser. No. 518,284, May 4, 1990, abandoned, which is a continuation of Ser. No. 388,320, Jul. 31, 1989, abandoned, which is a continuation of Ser. No. 282,844, Dec. 9, 1988, abandoned, which is a continuation of Ser. No. 158,093, Feb. 16, 1988, abandoned, which is a continuation of Ser. No. 51,219, May 12, 1987, abandoned, which is a continuation of Ser. No. 908,977, Sep. 17, 1986, abandoned, which is a continuation of Ser. No. 698,403, Feb. 5, 1985, abandoned.

[30] Foreign Application Priority Data

Feb. 8, 1984 [GB] United Kingdom ............... 8403274

[51] Int. Cl.⁵ .............................. G02B 7/188
[52] U.S. Cl. ...................................... 359/847
[58] Field of Search ............... 350/608, 611, 641, 642

[56] References Cited

U.S. PATENT DOCUMENTS

| | | | |
|---|---|---|---|
| 1,060,447 | 4/1913 | Geisler | 350/608 |
| 2,952,189 | 9/1960 | Pajes. | |
| 3,322,483 | 5/1967 | Jones. | |
| 3,552,835 | 1/1971 | Benzies | 350/608 |
| 3,623,796 | 11/1971 | Schweiger | 350/608 |
| 3,893,755 | 7/1975 | Cobarg et al. | |
| 3,936,159 | 2/1976 | Pavenick | 350/608 |
| 4,033,676 | 7/1977 | Brantley, Jr. et al. | |
| 4,046,462 | 9/1977 | Fletcher et al. | |
| 4,093,351 | 6/1978 | Perkins et al. | |
| 4,288,146 | 9/1981 | Johnson, Jr. et al. | |

FOREIGN PATENT DOCUMENTS

| | | |
|---|---|---|
| 583028 | 8/1985 | Australia. |
| 702500 | 1/1947 | Belgium. |
| 1272051 | 7/1990 | Canada. |
| 0071905 | 2/1983 | European Pat. Off. . |
| 152268 | 7/1987 | European Pat. Off. . |
| 2631551 | 2/1978 | Fed. Rep. of Germany. |
| 44-9516 | 5/1969 | Japan. |
| 380473 | 9/1932 | United Kingdom. |
| 952115 | 3/1965 | United Kingdom. |
| 2048153 | 12/1980 | United Kingdom. |

OTHER PUBLICATIONS

Muirhead Publication on "Variable Focal Length Mirrors", Review of Scientific Instruments, vol. 32, pp. 210, 211, published 1961.

Waddell publication of Apr. 19-22, 1983 entitled "Industrial Applications of Laser Technology", Proceedings of SPIE—The International Society for Optical Engineering.

*Primary Examiner*—Jon W. Henry
*Attorney, Agent, or Firm*—Bell, Seltzer, Park & Gibson

[57] ABSTRACT

A variable focal length mirror assembly incorporates a rigid circular structure (18) defining a hollow chamber (21) with a circular aperture (19). A flexible elastomer (12,13) having a reflective coating (11) is disposed across aperture (19) with coating (11) outwardly facing. The elastomer (12,13) is peripherally gripped and clamped by a circularly-extending clamp means (15,16) located radially outwardly of the structure (18). The clamp means (15,16) are mounted for movement axially of the structure (18) in order to render flat that portion of the elastomer (12,13) covering the aperture (19) in the absence of any applied elastomer deformation force. Means (20) for applying elastomer deformation forces are provided.

6 Claims, 2 Drawing Sheets

VARIABLE FOCAL LENGTH MIRROR ASSEMBLY INCLUDING A FLEXIBLE MEMBRANE

This application is a continuation of application Ser. No. 518,284, filed May 4, 1990, now abandoned, which in turn is a continuation of application Ser. No. 388,320, filed Jul. 31, 1989, now abandoned, which in turn is a continuation of application Ser. No. 282,844, filed Dec. 9, 1988, now abandoned, which in turn is a continuation of application Ser. No. 158,093, filed Feb. 16, 1988, now abandoned, which in turn is a continuation of application Ser. No. 051,219, filed May 12, 1987, now abandoned, which in turn is a continuation of application Ser. No. 908,977, filed Sep. 17, 1986, now abandoned, which in turn is a continuation of application Ser. No. 698,403, filed Feb. 5, 1985, now abandoned.

This invention relates to optical components in the form of mirrors.

Mirrors are well known optical components having a large variety of uses. Many mirrors of different shapes and sizes have already been manufactured. In particular, mirrors are generally constructed of a reflective coating mounted on a rigid carrier (e.g. glass) and as such are of fixed physical dimensions. This firstly imposes the restriction that after manufacture it is not possible to vary the optical characteristics of the mirror (for example by varying its focal length), and secondly imposes the restriction that the diameter or areal size of the mirror is limited to keep the weight thereof within manufacturing and user limits and to preserve optical quality.

In certain prior proposals (e.g. Muirhead, J.C.—Variable Focal Length Mirrors—Review of Scientific Instruments Vol. 32, pages 210, 211 published 1961 and also U.S. Pat. No. 4,046,462), a mirror has been constructed from a thin flexible carrier having a reflective surface, the carrier being peripherally clamped to a rigid hollow housing the interior of which was connected to a vacuum pump. In this arrangement variation of the vacuum pressure resulted in variation of the curvature of the reflective surface so that the optical characteristics of the mirror were rendered variable. However, the quality of mirror produced in accordance with these proposals was sufficient only for use as a flux collector and concentrator, the mirror having insufficient quality to function in an image-forming mode.

It is an object of the present invention to provide an improved form of variable focal length mirror assembly.

According to the present invention there is provided a variable focal length mirror assembly comprising a rigid circular structure defining a hollow chamber having a circular aperture, a flexible elastomer having a reflective coating adherent to one face thereof disposed across said circular aperture with said reflective coating outwardly facing, circularly-extending clamp means peripherally gripping and clamping said elastomer radially-outwardly of said circular structure, said clamp means being mounted for movement axially of said circular structure whereby to render flat that portion of the elastomer covering said circular aperture in the absence of any applied elastomer-deformation force, and means for applying elastomer-deformation forces to said elastomer whereby to render said reflective coating of variable focal length.

In one embodiment the elastomer comprises a first substantially inextensible flexible substrate carrying said reflective coating and a second resiliently flexible substrate in areal contiguity with said first substrate, the first substrate being relatively thin and not as stiff as the second substrate. When a differential pressure is applied across the substrate pair by connection and operation of a variable pressure source the resilient substrate is caused to deform locally around the periphery of the circular aperture thereby permitting displacement of the flexible substrate with minimal deformation so that both substrates are substantially in areal contiguity having a curvature determined in part by the peripheral shape of the circular aperture and in part by the nature and magnitude of the differential pressure. The areal contiguity of the two substrates further provides that localised regions of the flexible substrate which are prone to localised deformations are resiliently supported in a substantially undeformed manner by the resilient substrate. As a result the variable focal length mirror assembly is of a sufficiently high quality or resolution to function in an image-forming mode. Furthermore the mirror assembly is substantially insensitive to temperature variations.

In this arrangement the flexible substrate is preferably a thin layer or sheet of plastics material. The reflective coating may for example be metallic. Aluminised Mylar (MYLAR is a Registered Trade Mark) is a suitable flexible substrate for use in the visible waveband. Reflective coatings for other wavebands may also be utilised. The resilient substrate is a comparatively stiff thick layer or sheet of synthetic or natural latex and preferably the adjoining surfaces of the two substrates are substantially optically smooth to facilitate localised relative movements during alteration of the differential pressure across the substrate pair. In the case where aluminised Mylar is used as the flexible substrate both surfaces of the Mylar are preferably aluminised to enhance ease of localised relative movements.

In another embodiment the elastomer comprises a single resiliently flexible membrane having a thickness of the order of 50 microns or greater, which is sufficiently thick to facilitate manufacture with minimal localised imperfections.

The means for applying elastomer-deformation forces may be pneumatic and arranged to provide within the interior of the chamber either a pressure reduction or a pressure increase relative to the externally-prevailing pressure.

Embodiments of the present invention will now be described by way of example with reference to the accompanying drawings, in which.

Figure 2:
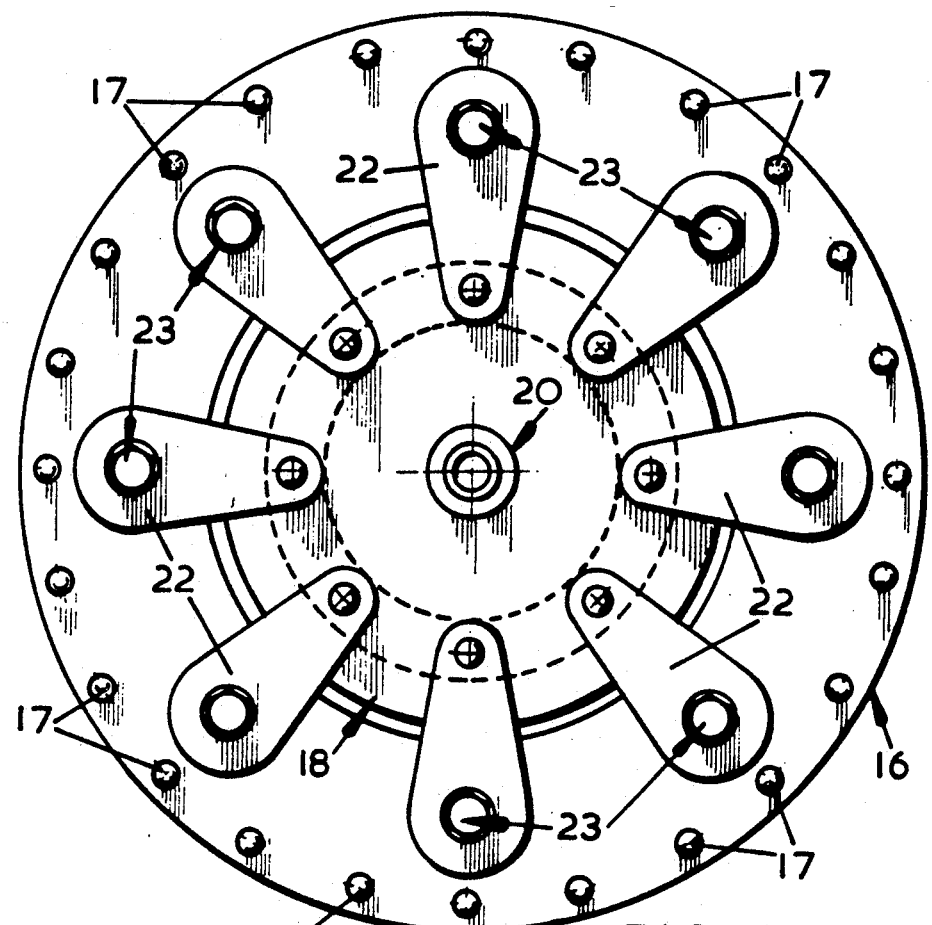
FIG. 2 is an end plan view of FIG. 1.
Figure 1:
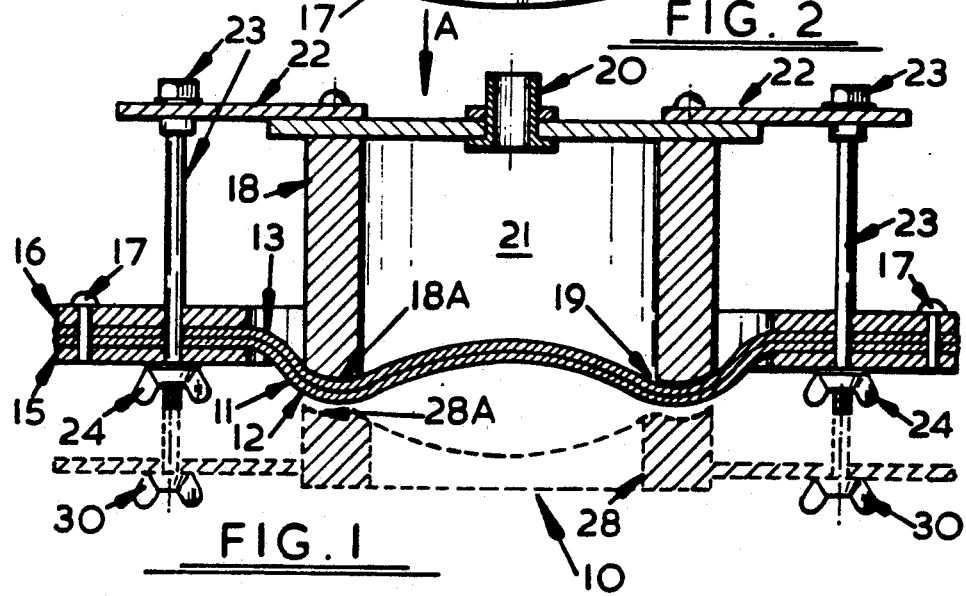
FIG. 1 is a sectional view of the embodiment.

In FIGS. 1 and 2 a mirror 10 is formed by a reflective coating 11 on one surface of a flexible substrate 12 which overlies a resilient substrate 13, the two substrates 12,13 being in mutual areal contiguity. Substrates 12,13 are both clamped around their periphery by ring clamps 15,16 which are held together by rivets 17 and carried by a support structure incorporating a hollow housing 18. Housing 18 forms a chamber 21 which is provided with an opening 19 at one end and substrates 12,13 overlie this opening. At its other end the chamber 21 is closed except for a valve inlet/outlet connection 20 whereby a source of variable pressure may be connected to housing 18 in order to vary the pressure within chamber 21 formed by housing 18 and substrates 12,13.

FIG. 2 is an end plan view of FIG. 1 taken in the direction of arrow A from which it will be appreciated that the arrangement is circularly symmetric and that the support structure comprises outrigger arms 22 secured at their radially innermost ends to housing 18 and carrying at their radially outermost ends bolts 23 which penetrate clamps 15, 16 and substrates 12,13 to receive adjustable wing nuts 24 which by appropriate tightening enables both substrates 12,13 to be held down against the circular end wall 18A of housing 18 such that in the absence of a differential pressure across substrates 12,13 both are substantially planar and taut but without any stretch being imparted at least to substrate 12. End wall 18A is itself smoothly profiled and relatively thick to provide a large area of contact with substrate 13 thereby reducing load intensities.

Substrate 13, which is resilient, is preferably natural or synthetic rubber and of substantial thickness in comparison with the thickness of substrate 12 which is flexible, at least to the limited extent required to fulfil the requirements of its function as will be explained, but is substantially non-resilient. Substrate 12 is preferably made of Mylar (TM) and coating 11 may be an aluminised coating. By way of example substrate 12 may be of the order of 10–20 microns in thickness whereas substrate 13 is at least ten times that thickness and preferably even thicker. Good test results have been achieved with substrate 13 about 350 microns in thickness and substrate 12 about 14 microns in thickness.

In operation, when chamber 21 is at a pressure less than that prevailing externally of the housing 18 the substrate pair 12,13 are caused to deform, with substantially spherical curvature in this embodiment, from their initial taut planar condition overlying aperture 19. Because substrate 13 is resilient localised thinning occurs at housing end wall 18A which consequently permits displacement and deformation of substrate 12 without any significant stretch forces being imposed therein. Substrate 12 therefore takes up a substantially spherical shape without being stretched and is resiliently supported throughout its areal extent by the resilient substrate 13. Thus any localised tendency (arising from manufacturing imperfections) for substrate 12 to bulge is prevented by the supporting presence of substrate 13. As a result the optical quality of the mirror 10 is sufficiently high to enable the mirror to be used in an image-forming mode.

FIG. 1 also illustrates in phantom an adaptation of the apparatus more particular to chamber 21 being pressurised above ambient so that the substrates 12,13 provide a convex reflective surface. In this modification a collar 28 is provided with end face 28A to mate with housing 18 and end wall 18A, the collar 28 being carried by extended bolts 23 and clamped by wing nuts 30. Operation of the apparatus in this mode is similar to that described above.

It will be appreciated that the described apparatus is relatively simple in construction and light in weight and can be enlarged in radial size very simply to any required areal size of reflective surface. Furthermore by selecting the pressure differential across the substrate pair a desired curvature can be provided. Thus mirror 10 is of variable focal length.

By way of example a mirror 10 constructed with substrate 12 in the form of a 14 micron thick sheet of aluminised Mylar and substrate 13 in the form of a 350 micron thick sheet of natural rubber has been tested for optical quality utilising a standard SLR Camera Lens Test Chart. The chart, consisting of various sets of straight black bars on a white background (thereby forming black/white line pairs) was set up as an object at a distance of 27 times the focal length of the mirror under test and in the image plane the image of the chart was inspected by the naked eye. It was possible, for the 14 inch diameter (355 mm) mirror at f 0.5 under test, to resolve all sets of bars down to as close as 10 line pairs per millimeter without any spherical aberration being detected over the entire image plane. Tests at higher f-numbers such as f 1.0 yielded even better results, as would be expected. This is to be compared with the theoretical maximum resolution achievable with a perfectly ground rigid glass spherical mirror of 14 inch (355 mm) diameter which at F 2.0 provides resolution down to 9 line pairs per millimeter, smaller f-numbers of course produce poorer resolution whilst larger f-numbers produce improved resolution (subject to diffraction limiting).

It will be appreciated that the extent of flexibility of substrate 12 is limited by the presence of reflective coating 11 and in order to combine both properties to the best extent coating 11 is preferably very thin. The thinner the coating 11, however, the poorer is the reflectivity thereof and one practical way of improving this situation without adversely affecting flexibility is to coat the reverse surface of substrate 12 with a similar thin coating so that both surfaces of substrate 12 are coated. This has the additional unexpected effect of improving the areal contiguity of the two substrates 12,13 and it is believed that this results from a lowering of the frictional grip at the interface between substrates 12,13. In any event from optical requirements it is very desirable that the or each coating 11 is of substantially constant thickness such as can be achieved by ion plating or vacuum deposition.

Various modifications are possible. For example substrate 13 may be laminated, that is to say formed of several layers of membranes each being resilient. In this way the thickness of substrate 13 may be enlarged without difficulty as may be desirable in order to constrain abnormally large localised manufacturing variations in thickness and/or stresses of substrate 12. Clamp rings 15,16 and housing 18 may be segmented and conjoined if very large mirror diameters (e.g. several meters) are required.

Figure 3:
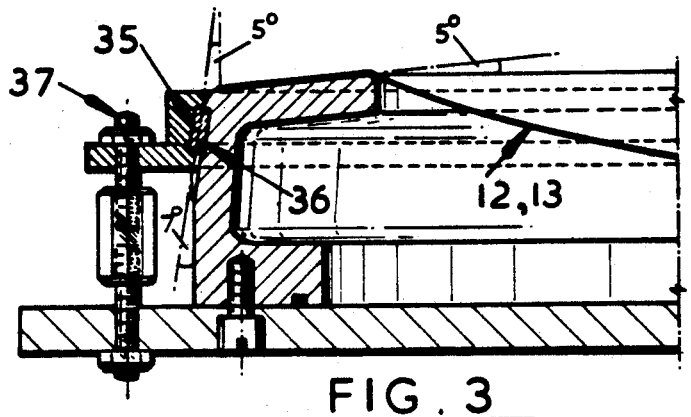
FIGS. 3–5 illustrate alternative embodiments to that of FIG. 2.

FIG. 3 illustrates an alternative embodiment in which the clamp ring arrangement of FIGS. 1 and 2 is replaced by a clamping arrangement which obviates any requirement to puncture the substrates 12,13 and it has been found that this improves the optical performance of the mirror around its perimeter. In the FIG. 3 arrangement substrates 12,13 extend between two circular rubber inserts 35,36 fitted to unequally inclined surfaces so that when bolts 37 are tightened a wedging action occurs whereby substrates 12,13 are securely and evenly clamped.

Figure 4:
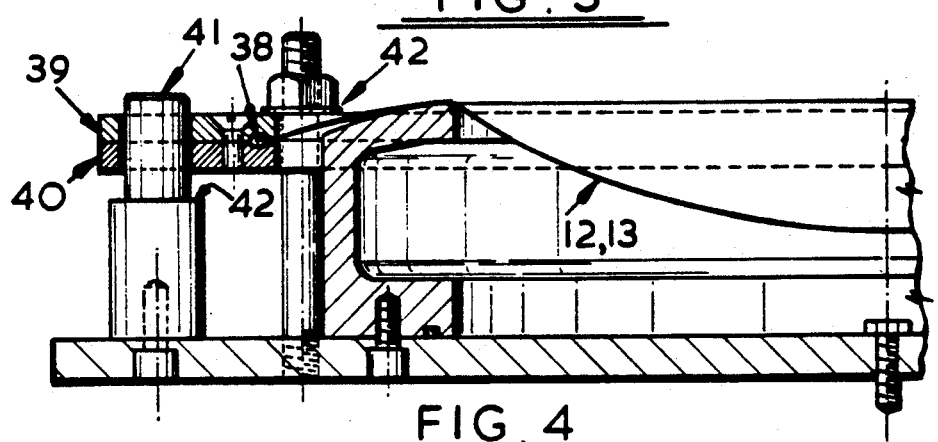

FIG. 4 illustrates a further clamping arrangement where the substrates 12,13 are perimetrically fitted with a rubber bead 38 of U section which is then clamped between rings 39,40 which are permitted to slide axially to a limited extent on pins 41 whilst being limited by stops 42.

Figure 5:
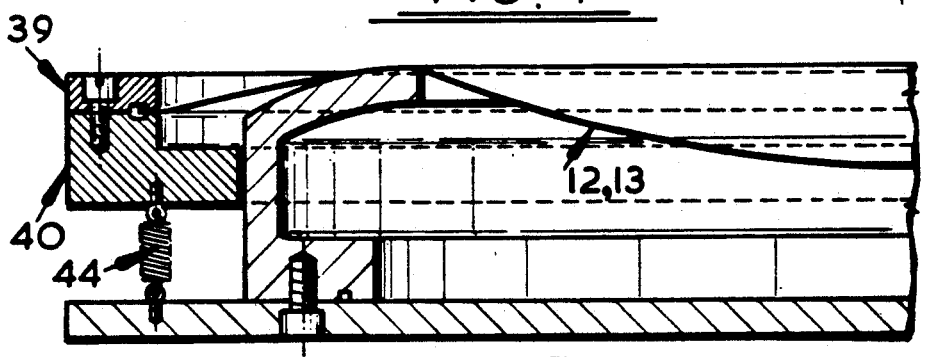

FIG. 5 illustrates a still further clamping arrangement generally similar to the FIG. 4 arrangement except that the clamp rings 39,40 are spring loaded by means of springs 44 against movement of the substrates 12,13 occurring by virtue of differential pressure applied across the substrates 12,13.

The FIG. 3-5 embodiments, in addition to being capable of operation with the substrate pair 12,13 referred to in FIGS. 1 and 2, are also capable of operation with a unified membrane of the order of 50 microns in thickness or greater and having a strain capability of about 5%. In particular it has been found that such thick membranes do not require the addition of a resilient backing substrate (13) to eliminate the problems of localised bulging because they can be manufactured with excellent thickness control. Furthermore such membranes in the FIGS. 3-5 embodiments are easily rendered optically flat in the absence of a pressure differential with minimum pre-tensioning thereby permitting maximum strain to be applied (within the elastic range of the membrane) so as to form the membrane into an f 0.5 mirror for example, when the strain applied amounts to about 4.7%. In this connection it is particularly important to achieve even edge gripping of the membrane in the manner detailed in FIGS. 3-5 and to utilise the central circular stretching frame (18) detailed in each of the embodiments. Image resolution tests carried out on an 80 micron thick membrane have produced results similar to those detailed above.

What is claimed is:

1. A variable focal length mirror assembly comprising a rigid circular structure defining a hollow chamber having a circular aperture, a flexible membrane having a reflective coating adherent to one face thereof disposed across said aperture with said reflective coating outwardly facing, circularly-extending clamp means peripherally gripping and clamping said membrane radially-outwardly of said structure, said clamp means being mounted for movement axially of said structure whereby to render flat that portion of the membrane covering said aperture in the absence of any applied membrane-deformation force, and means for applying membrane deformation forces to said membrane whereby to render said reflective coating of variable focal length, wherein said membrane is thin and substantially inextensible and a resiliently flexible substrate in areal contiguity with said membrane is located between the membrane and said aperture, the membrane not being as stiff as the substrate.

2. A variable focal length mirror assembly of image forming quality at any focal length comprising a rigid circular structure defining a hollow chamber having a circular aperture, a flexible membrane having a reflective coating adherent to one face thereof disposed across said circular aperture with said reflective coating outwardly facing, circularly-extending clamp means peripherally gripping and clamping said membrane radially-outwardly of said circular structure, means for mounting said clamp means for movement axially of said circularly structure whereby to render flat that portion of the membrane covering said circular aperture in the absence of any applied membrane deformation force, means located at the interface between said structure and said membrane for reducing load intensities and thereby controlling the stress distribution in the membrane to provide image forming qualities, said load intensity reducing means comprising a resiliently flexible substrate contiguous with said flexible membrane, and pneumatic means connected to said chamber for applying pneumatic membrane-deformation forces to said membrane whereby selectively to render said reflective coating of variable focal length.

3. An assembly as claimed in claim 1 or 2, wherein said clamp means is resiliently mounted on a support.

4. A variable focal length mirror assembly comprising a rigid circular structure defining a hollow chamber having a circular aperture, a flexible membrane having a reflective coating adherent to one face thereof disposed across said circular aperture with said reflective coating outwardly facing, said membrane comprising an elastomeric substrate, circularly-extending clamp means peripherally gripping and clamping said membrane radially-outwardly of said circular structure and including a circularly-extending groove and an annular bead of deformable material housed in said groove for being fitted to the perimeter area of said membrane, said clamp means being mounted for movement axially of said circularly structure whereby to render flat that portion of the membrane covering said circular aperture in the absence of any applied membrane deformation force, means located at the interface between the structure and the reflective coating for controlling the stress distribution in the membrane around the periphery of the circular aperture, and pneumatic means connected to said chamber for applying pneumatic membrane-deformation forces to said membrane whereby selectively to render said reflective coating of variable focal length.

5. An assembly as claimed in claim 4, wherein said stress control means comprises a thickness of flexible material having a strain capability of at least 5%.

6. An assembly as claimed in claim 1, 2, or 4, wherein said clamp means comprises a plurality of tensioning members circumferentially disposed around the structure, the tensioning members being individually adjustable to facilitate rendering said membrane portion flat and with minimum pretensioning forces being imparted to the membrane in the absence of any applied membrane-deformation force.

* * * * *